UNITED STATES PATENT OFFICE.

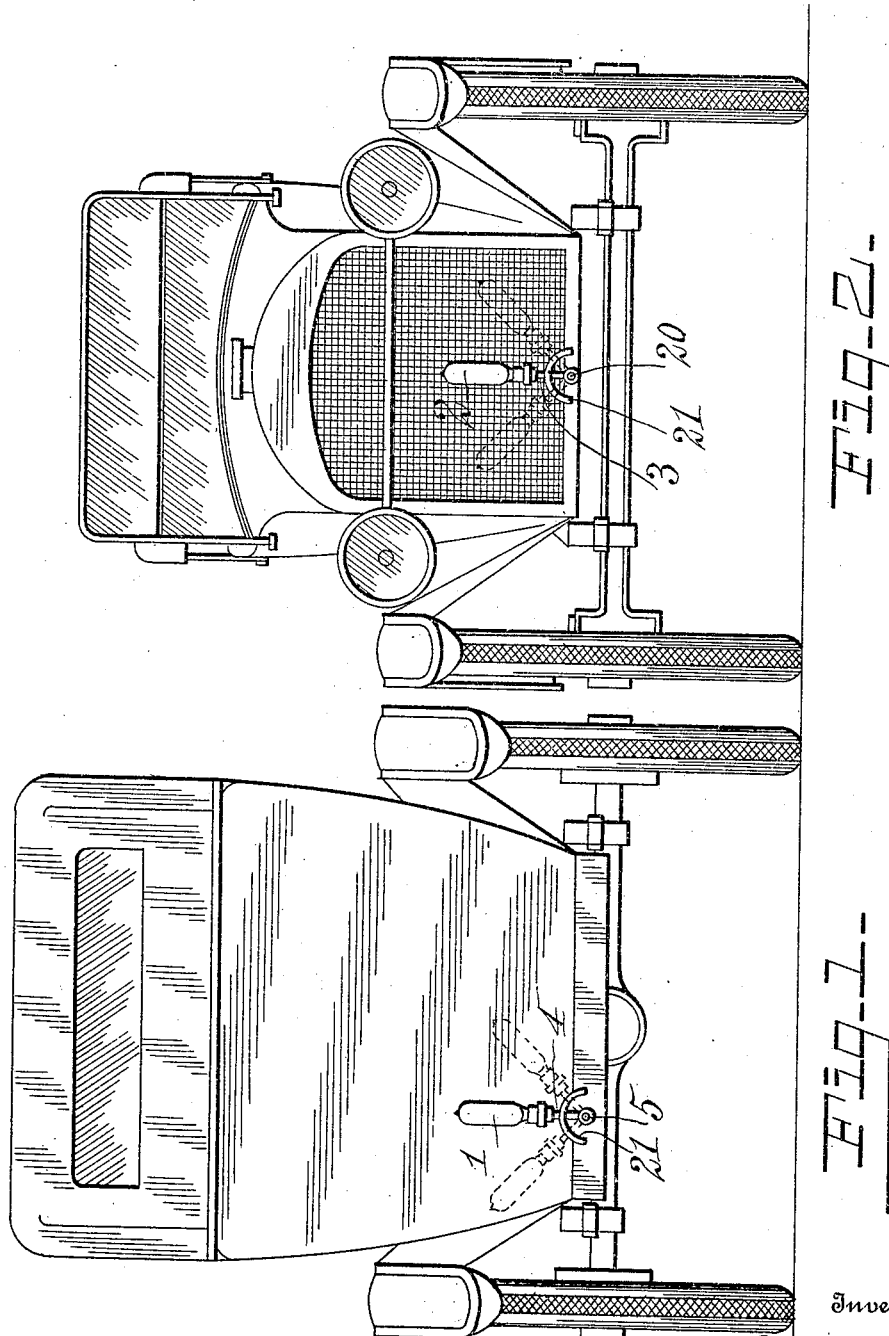

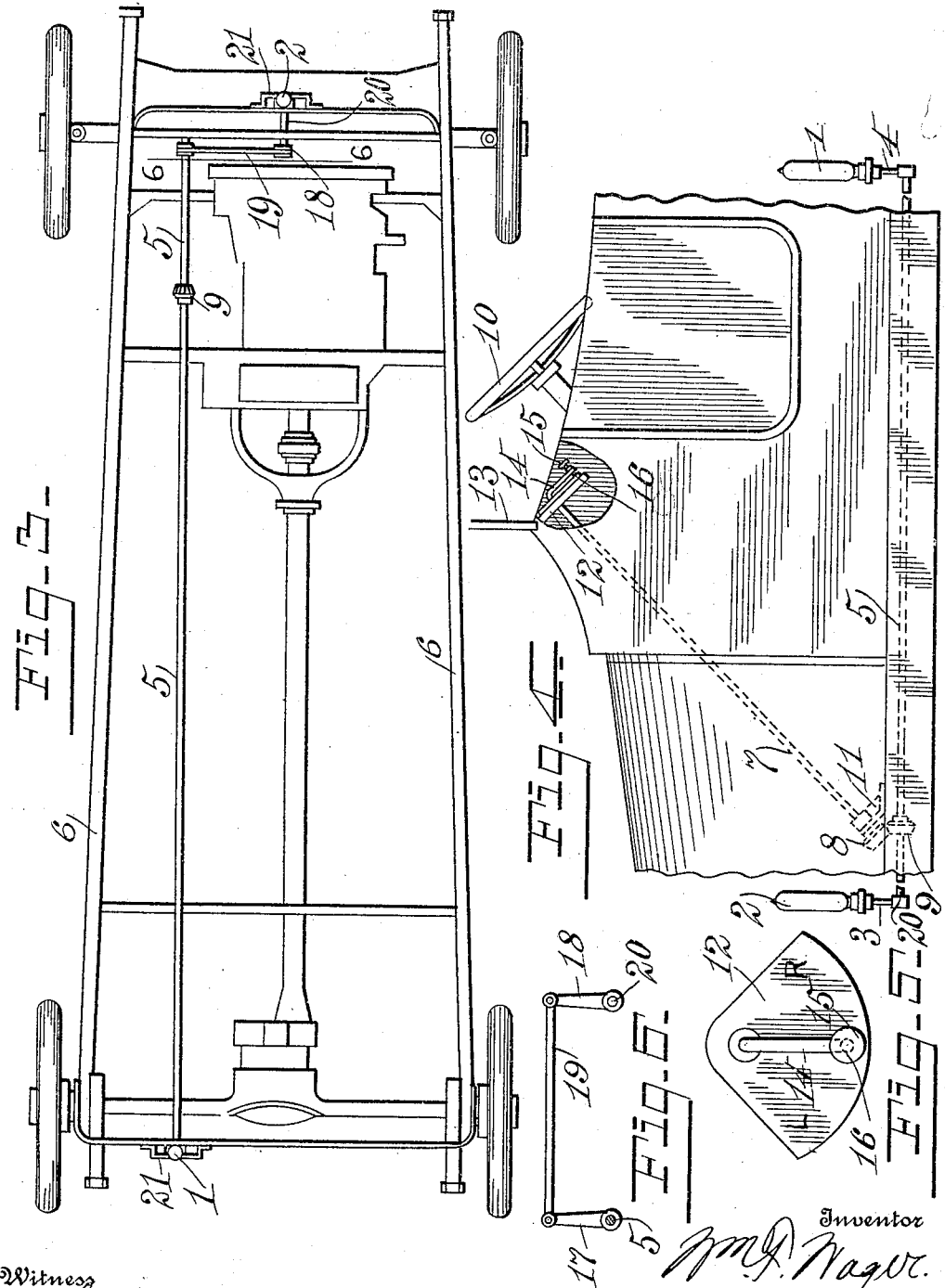

WILLIAM F. WAGER, OF DAYTON, OHIO, ASSIGNOR OF ONE-HALF TO FORREST L. MAY, OF DAYTON, OHIO.

DIRECTION-INDICATOR FOR AUTOMOBILES.

1,234,831. Specification of Letters Patent. Patented July 31, 1917.

Application filed August 7, 1916. Serial No. 113,610.

*To all whom it may concern:*

Be it known that I, WILLIAM F. WAGER, a citizen of the United States, residing at Dayton, in the county of Montgomery and State of Ohio, have invented certain new and useful Improvements in Direction-Indicators for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain improvements and advantages in indicators especially designed and adapted for indicating the direction of an automobile or motor vehicle to those who are approaching such vehicle in the rear or front. For example, in approaching corners, it can be readily ascertained by those in both the front and rear of a moving vehicle whether it will proceed in a direct course or turn as it approaches street intersections. The object of the invention is to provide simplified and comparatively inexpensive means for obtaining the above results.

Proceeding to a detail description of my invention reference is first made to the accompanying drawings illustrating the same. In these drawings Figures 1 and 2 are elevations of an automobile showing the indicators in position on the front and rear thereof; Fig. 3 is a plan view of the chassis or frame of an automobile showing the indicators and connections; Fig. 4 is a side elevation of a portion of body of an automobile showing the device extended in proximity to the steering wheel; Fig. 5 is a detail view of the indicator or plate which serves to direct the movements of the signal lamps through their interconnected mechanism; Fig. 6 is a detail view of the means for connecting the front lamp with the operating devices.

In a detail description of the invention, similar reference characters indicate the same parts.

The indicators or lamps 1 and 2, preferably two in number, are located one at each end of the vehicle. Each indicator is preferably in the form of an oblong lamp of a character of glass suitable for reflecting a red light. These lamps are of a length which is suitable for readily attracting the eye of persons at a considerable distance and the same are connected to the service battery of the automobile in any suitable manner. The battery circuit is well known and it has not been deemed necessary to illustrate either the battery or lamp circuits. The said lamps 1 and 2 are supported on stems 3 and 4 one of which is rigidly attached directly to an end of a rod 5 which is suitably journaled in the chassis or frame 6 of the vehicle. The rod 5 is connected to an operating rod 7 by means of bevel gears 8 and 9, said rod 7 being extended up to a convenient point in proximity to the driver's position or adjacent to the steering wheel 10 of the machine. The rod 7 is supported at one end in a bearing 11 secured to a convenient part of the chassis and at its upper end it has a bearing in a segment plate 12 which in turn is supported in front of the driver immediately below the windshield 13. The upper end of said operating rod 7 is turned after passing through an opening in the plate 12 and forms a hand portion 14 which moves over the face of the plate 12, such movement being given it by a finger knob 15. Letters are placed on the upper side of the plate 12 to direct the turning of the lights 1 and 2 to one side or the other or to the straight position as indicated in the full lines and broken lines showing the three positions of the lamps. (Figs. 1 and 2). The handle portion 14 of the rod 7 is of a springy or resilient character and the pin 16 upon which the finger knob 15 is mounted is designed to enter an indentation in the plate or board 12 whereby the rod 7 is maintained in the central position as shown in Fig. 5 until said portion 14 is raised by the hand sufficiently to release the pin 16 and thus permit the lamps 1 and 2 to be shifted to one or the other side according to the direction the vehicle is to take. The front lamp 2, it will be seen, is located in the center of the machine while the rear lamp 1 is placed a little to one side. In order to vary the locations of the lamps, the front lamp 2 is connected with the turning rod 5 by cranks 17 and 18 which are connected themselves by a rod 19. The first named crank, to-wit, 17, is rigidly connected to the front end of the rod 7, while crank 18 is directly connected to an arm 20 upon which the front lamp is mounted. The lamp stems 3 and 4 are confined by guards 21 of a segment form, as shown in Figs. 1 and 2.

Having described my invention, I claim.

An indicator for automobiles, comprising a continuous rod extending from front to rear of the chassis, an elongated lamp arranged in front of the radiator in a central position, an elongated lamp arranged in the rear of the body and to one side thereof and connected with the rear end of said rod by an upright stem, a vertically extended crank connected to the front end of said rod, a vertically extended crank connected to said first-named crank by a connecting rod, a horizontal arm connected to the last-named crank and supporting said front lamp, an operating rod geared to the forward portion of said continuous rod, the upper end of said operating rod extending in front of the driver and provided with a handle, a plate arranged beneath said handle with indications thereon governing the movement of said handle, and means on the handle interlocking with the indicator plate to maintain the handle in position when the lamps are moved to their perpendicular positions, substantially as described.

In testimony whereof I affix my signature, in presence of two witnesses.

WILLIAM F. WAGER.

Witnesses:
 FORREST L. MAY,
 M. SIEBLER.

Copies of this patent may be obtained for five cents each, by addressing the "Commissioner of Patents, Washington, D. C."